July 25, 1961 H. F. RIETH 2,993,990
RADIO RECEIVER
Filed Jan. 19, 1959
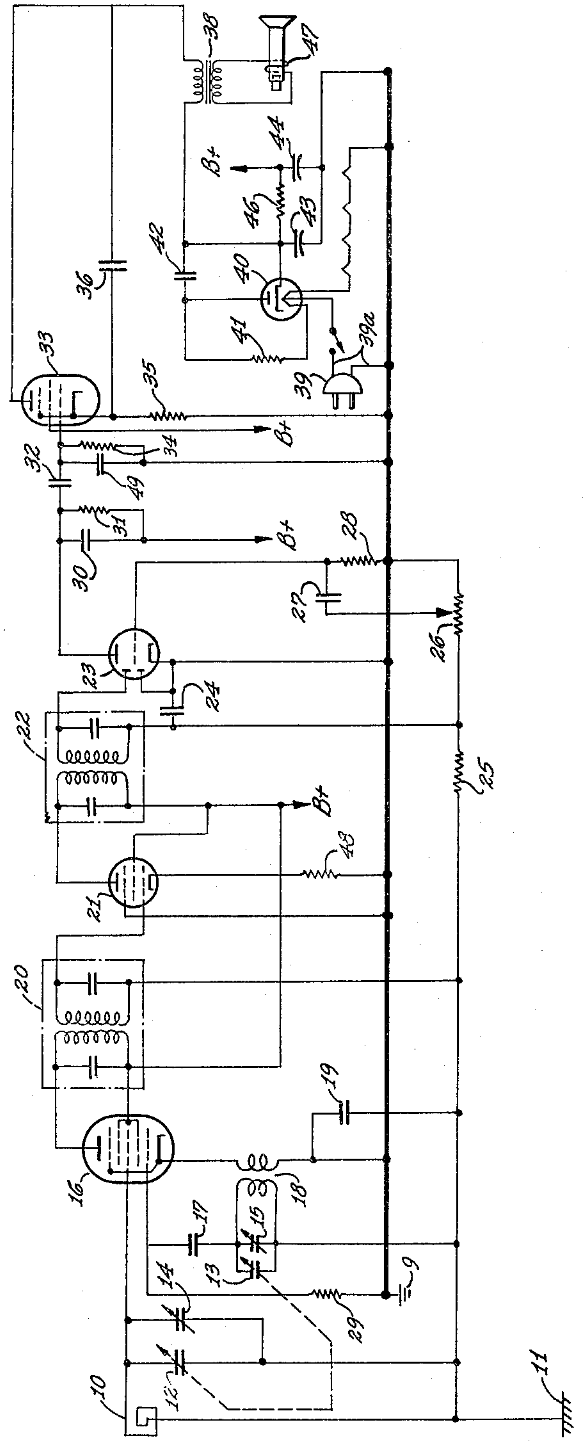
INVENTOR:
Harold F. Rieth
By Smyth & Roston
Attorneys.

United States Patent Office 2,993,990

Patented July 25, 1961

2,993,990

RADIO RECEIVER

Harold F. Rieth, Pasadena, Calif., assignor to Packard-Bell Electronics Corporation, Los Angeles, Calif., a corporation of California Filed Jan. 19, 1959, Ser. No. 787,460
6 Claims. (Cl. 250—20)

This invention relates to radio receivers and, more particularly, to superheterodyne receivers for selectively receiving radio frequency signals which are modulated by audio frequency signals.

A superheterodyne receiver is one which converts any of the incoming radio-frequency signals to a predetermined intermediate frequency signal by heating an adjustable locally generated signal with the incoming signal. Conventional, mass-produced receivers for the home are generally superheterodyne receivers which have become stabilized in design over the years. Before the receiver design became stabilized, each component of the receiver was carefully evaluated many times. All unnecessary components were believed to have been discarded after considerable thought and experiment because each such component represented an important cost item of a competitive mass-produced receiver. Because of this, each component presently in the stabilized design has been considered by experts to perform an important and necessary function in maintaining the quality of operation in the receiver.

One of the important functions in the operation of the conventional superheterodyne receiver is the automatic volume control. The automatic volume control compensates variations in the signal strength resulting from fading by biasing the radio frequency and intermediate frequency stages of the receiver with a variable direct current signal having a magnitude proportional to the signal strength of the carrier. The direct current biasing signal is derived from the output of an audio detector stage by utilizing a resistor-capacitor arrangement to filter the audio frequency components of the output signals. The magnitude of the time constant of the arrangement is restricted to a relatively narrow range because it must be large enough to completely filter the audio frequency components or modulation but yet not sufficiently large so as to reduce the audio frequency bass response.

The automatic volume control compensates for the fading of the incoming signal but, at the same time, it introduces an impedance coupling between the intermediate frequency stage and the radio frequency stage across the capacitor of the resistor-capacitor arrangement. A part of the intermediate frequency signal appears across the capacitor and is introduced to the radio frequency stage, causing regeneration at the low frequency end of the broadcast band and at signal frequencies which are harmonics of the intermediate frequency signal.

Another of the important functions in the operation of the conventional superheterodyne receiver is the prevention of electrical shock upon contact with the chassis of the receiver. If the receiver is designed to operate only from alternating current sources, the prevention of shock is not a problem because the two power input leads are isolated from the chassis by a power transformer. When the receiver either operates only from direct current sources or is an A.C./D.C. receiver, operating from both alternating and direct current sources, it is necessary to avoid coupling either of the power input leads to the chassis to avoid the possibility of shock.

The solution to the problem of avoiding shock in the D.C. and A.C./D.C. receivers and complying with safety standards has been to connect one of the power input leads to a floating or internal ground usually referred to as a B minus circuit. The floating ground is by-passed or coupled to the chassis ground through a suitable capacitor so that the chassis and the internal ground are isolated for direct voltages but not for alternating signals, especially at the radio frequencies. The size of this coupling capacitor is restricted to a relatively narrow range. By way of illustration, the coupling capacitor should be sufficiently large to pass radio frequency signals so as not to affect the operation of the radio frequency stages, especially when a person simultaneously contacts the floating ground and the chassis. However, the capacitor should not be too large because it then builds up a charge sufficient to shock and possibly injure a person contacting the chassis and the floating ground.

These two functions, the automatic volume control and the prevention of shock, are interrelated in that they both contribute to intermediate frequency instability. The capacitor connecting the floating ground to chassis couples part of the intermediate frequency signal across the capacitor of the automatic volume control resistor-capacitor arrangement. Because of the connection of the resistor-capacitor arrangement to the intermediate frequency stage as well as to the radio frequency stage, an intermediate frequency signal, therefore, also appears across the capacitor of the automatic volume control arrangement and, therefore, at the input of the radio frequency stage.

Various attempts have been made to solve this regeneration or intermediate frequency instability problem. For example, an inductor has been added to the capacitor coupling between the chassis and the floating ground to tune the coupling to the intermediate frequency signal. Such attempts have heretofore only been partially successful because some of the intermediate frequency signal still appears across the capacitor of the automatic volume control circuit arrangement. Moreover, these prior attempts have generally been too expensive for use in competitive, mass-produced receivers since they have added materially to the cost of the components in the receivers.

In the specific illustrative embodiment of this invention, intermediate frequency regeneration and instability is considerably reduced and the number of components is actually reduced as well. In this way, a receiver having both an increased quality and an enhanced economy is provided. These advantages are accomplished by combining the two functions of automatic volume control and shock prevention in a unified circuit arrangement. A single capacitor is utilized both as part of the resistor-capacitor filtering arrangement of the automatic volume control and as the direct current isolation between the internal ground and the chassis. The magnitude of the capacitor is selected to comply with the limitations on the time constant of the filtering arrangement and also with the requirements of shock prevention. The usual volume control filter capacitor which couples the antenna to the internal ground is eliminated. Because of this, the variable direct-current biasing signal developed by the automatic volume control may be introduced directly to the chassis to vary the direct potential of the chassis relative to the floating ground. This variation, in turn, compensates for any fading of the input radio frequency signals. The elimination of the filter capacitor also prevents intermediate frequency signals from being across the filter capacitor so that such signals cannot be coupled back to the input of the radio frequency stage as in the receivers heretofore used. Undesirable regeneration of the signals at the radio frequencies and intermediate frequencies is further materially reduced because the antenna or other radio frequency input is also connected directly to the chassis which is now effectively part of the automatic volume control.

The capacitor coupling the floating ground and the chassis ground is still retained in the receiver constituting this invention so as to prevent any person contacting the floating ground and the chassis from receiving an electrical shock. This capacitor now also serves as the filter capacitor in the automatic volume control arrangement by connecting the antenna directly to the chassis. The use of one capacitor for functions previously required of two capacitors constitutes a material saving in cost. Even though one capacitor now serves the function previously required of two capacitors, enhanced operation of the receiver is obtained. For example, the connection of the antenna directly to ground prevents instability in the operation of the receiver from being produced as a result of a feedback of the intermediate frequency signals, as in the receivers now in use. Furthermore, since the value of the first capacitor coupling the floating ground and the chassis ground is greater than the value of the second capacitor previously used in the automatic volume arrangement, an enhanced control of automatic volume is obtained by using the first capacitor in this invention to serve also as the second capacitor.

Further advantages and features of this invention will become apparent upon consideration of the following description when read in conjunction with the drawing wherein the single figure is a circuit representation of an A.C./D.C. superheterodyne receiver of this invention.

Referring to the single figure, the radio frequency signals are received by a radio frequency tuned circuit arrangement including a loop antenna 10 and an adjustable or variable capacitor 12. One end of the loop antenna 10 and of the adjustable capacitor 12 is connected directly to the chassis 11 of the receiver. The other ends of the loop antenna 12 and the adjustable capacitor 12 are coupled to the third grid of a pentagrid converter tube 16, which is included in first detecting means. The tuning capacitor 12 is ganged to an adjustable capacitor 13, which is included in an oscillator circuit. The capacitors 12 and 13 are shunted, respectively, by trimmer capacitors 14 and 15.

The converter tube 16 functions both as part of the oscillator circuit and also to heterodyne the incoming radio frequency signal with a signal generated by the oscillator circuit to produce a beat or heterodyne signal which is referred to as the intermediate frequency signal. The radio frequency signals are amplitude modulated signals with the modulation being audio frequency signals and the carrier having a frequency in the standard broadcast band of 550 to 1700 kilocycles. The intermediate frequency signal is also in the radio frequency range and may have a frequency of 455 kilocycles regardless of the frequency of the incoming carrier.

The frequency of the intermediate frequency signal is the same regardless of the incoming carrier frequency because the frequency of the oscillator circuit is adjusted by adjusting the capacitor 13 on a co-ordinated basis with the tuning capacitor 12. If, for example, the incoming signal is 7000 kilocycles, the oscillator circuit is set by the capacitor 13 at a frequency of 7455 kilocycles to provide a difference or intermediate frequency of 455 kilocycles at the anode of the converter tube 16. A sum frequency of 14,455 kilocycles is also produced but is removed by the intermediate frequency tuned circuits 20 and 22 which are hereinafter described. The purpose of the frequency conversion is to change the frequency of the received signal to a lower fixed value where amplifying circuits can be designed to have enhanced stability and gain as well as proper selectivity and fidelity.

The adjustable oscillator circuit includes the cathode and the first two grids of the pentagrid converter tube 16. The first grid functions as the usual control grid of the oscillator while the second grid functions as the usual anode. The electrons which pass through the second grid en route to the anode increase and decrease in number at the frequency of the oscillator circuit. The frequency of oscillation is dependent upon the parameters of the tuned circuit arrangement including a parallel arrangement of the capacitor 13, the trimmer capacitor 15 and the secondary of a transformer 18.

The capacitor 13 is coupled at one terminal to the chassis 11 and at the other terminal by a capacitor 17 to the control or first grid of the tube 16. The first grid is also connected through a grid resistor 29 to a floating or internal ground 9 which is also generally referred to as a B minus circuit. The primary winding of the transformer 18 is connected between the cathode of the tube 16 and the internal ground 9. As will be seen from the subsequent discussion, the potential on the floating ground 9 varies in accordance with the operation of different stages in the receiver.

The internal ground 9 is utilized as a common junction for the various stages of the superheterodyne receiver. The capacitors 12 to 15, inclusive, are mounted directly on the chassis, rather than being connected to the floating ground 9 because they would otherwise have to be insulated from the chassis 11. The cost of providing the insulation is a sufficient deterrent from a cost standpoint so that the connection is provided to the chassis 11 instead of to the floating ground 9. All the rest of the common junction connections are to the ground 9 except, as is hereinafter described, for the connection from the automatic volume control.

The purpose of providing an internal ground 9 and not connecting the various components directly to the chassis 11 is to isolate the input power leads **39*a* from the chassis 11 to reduce the possibility of electrical shock. If one of the two input leads 39*a* is directly connected to the chassis 11**, an individual contacting the chassis may receive a shock. It is for this reason that most superheterodyne receivers produced in the United States utilize an internal floating ground and connect one of the input power leads to this floating ground.

The input leads **39*a* are connected by a plug 39 to the usual house supply, which may provide either an alternating potential or a direct potential of approximately 115 volts. The input leads 39*a* are also connected respectively to the internal ground 9 and to the serially connected filaments of five vacuum tubes 16, 21, 23, 33 and 40 utilized in the superheterodyne receiver. The tube 40** is an indirectly heated low impedance tube utilized as a half wave rectifier for converting alternating current potentials to direct current potentials.

The alternating potential or direct potential applied to the plug 39 is introduced to a resistor 41 which is connected between the filament and the anode of the tube 40. The anode of the tube 40 is coupled through a capacitor 42 to a filter including the capacitors 43 and 44 and the resistor 46.

Upon the introduction of an alternating potential, the tube 40 operates to rectify the input potential by passing signals of only a particular polarity in alternate half cycles. The filter including the capacitors 43 and 44 and the resistor 46 operate to smooth the rectified potential passed by the tube 40 so that ripples in potential are considerably reduced. When a direct potential is introduced to the plug 39, this potential is introduced to the B+ lead through a circuit including the resistor 41, the tube 40 and a resistor connected between the capacitors 43 and 44.

The B+ potential from the capacitor 44 is supplied to the anode of the converter tube 16 through the primary winding of a transformer in a tuned circuit 20. The B+ potential is also supplied directly to the second and fourth grids of the tube 16. The second grid of the tube 16, which as described above, functions as an anode for the electron-coupled oscillator circuit, is therefore maintained at a constant direct-current potential. By maintaining the potential of the second grid in the tube 16 at a constant value, the grid shields the oscillator section of the tube from the radio frequency currents in the rest of the tube. The constant potential on the second grid in the tube 16 does not interfere with the heterodyning effect of the oscillator circuit because the electrons pass through the second grid to the heterodyning section of the converter tube 16.

The radio frequency signal, which is applied to the third grid, controls the amount of electrons passing from the second grid to the anode of the tube 16. The second grid functions therefore as a virtual cathode for the heterodyning or radio frequency section of the tube 16.

The fourth grid functions as a screen grid and the fifth grid functions as a suppressor grid to provide for a pentode type characteristic. The output at the anode of the tube 16 includes signals having a frequency corresponding to the sum of the radio and heterodyning frequencies and corresponding to the difference between the radio and heterodyning frequencies.

The output of the tube 16 is coupled to the tuned circuit 20, which passes frequencies in a narrow range including 455 kilocycles to the intermediate frequency amplifer tube 21. The tube 21 is a pentode having its cathode connected to one terminal of a resistor 48, the other terminal of which is connected to the floating ground 9. The screen grid of the tube 21 is connected directly to the B+ supply and the suppressor grid of the tube is connected directly to the floating ground 9. The B+ supply is introduced to the anode of the tube 21 through the primary winding of a transformer in a tuned circuit 22.

The amplifier tube 21 couples the amplified intermediate frequency signal through the tuned circuit 22 to the tube 23, which is included in second detecting means to recover the audio frequency signals. The tube 23 is a dual diode-triode wherein the upper anode of the diode section is utilized for both signal detection and for automatic volume control rectification. The lower anode is directly connected to the cathode of the tube 23 so as not to be utilized.

At each positive peak of the intermediate frequency signal, the upper diode section of the tube 23 conducts to charge a capacitor 24 connected between the cathode in the tube 23 and the secondary winding of the intermediate frequency transformer in the tuned circuit 22. This charging of the capacitor 24 occurs through a circuit including the secondary winding of the transformer in the tuned circuit 22, the upper diode of the tube 23, the triode of the tube 23 and the capacitor 24. Between peaks of the intermediate frequency signal, the capacitor 24 discharges slightly through a volume control potentiometer 26. The discharge of the capacitor 24 takes place through a circuit including the capacitor 24, the potentiometer 26, the capacitor 27 and the resistance 28. The capacitor 24 becomes recharged by the next positive peak of the intermediate frequency signal so as to constantly indicate the peaks of the intermediate frequency signal.

Since the peaks of the intermediate frequency signals indicate the modulation envelope of the signal received by the antenna 10, the potential produced across the potentiometer 26 is a reproduction of the modulation envelope of the applied signal. The time constant of the RC circuit formed by the capacitor 24 and the potentiometer 26 is small enough to permit the potential across the capacitor 24 to follow the changes in ampltiude of the audio frequency modulation envelope.

A portion of the audio frequency signal across the potentiometer 26 is introduced from its movable arm through the capacitor 27 to the grid of the triode section of the tube 23. The grid is connected to the floating ground 9 by the grid resistor 28, and B+ potential is introduced to the anode of the triode section in the tube 23 through a resistor 31 shunted by a capacitor 30. The triode section of the tube 23 operates to amplify the audio signal introduced to its grid.

The amplified audio frequency signal from the triode section of the tube 23 is coupled through a capacitor 32 to the control grid of a power amplifier pentode tube 33. The control grid is coupled electrically to the floating ground 9 by a grid leak resistor 34, which is shunted by a capacitor 49. The cathode and the suppressor grid of the tube 33 are coupled through a resistor 35 to the floating ground 9 and through a capacitor 36 to the anode of the tube. The screen grid is connected directly to the B+ supply, and anode potential is introduced to the tube 33 through the primary winding of an output transformer 38. The audio frequency signals are coupled through the transformer 38 to the speaker 47 which converts these signals into a corresponding audible representation.

The output produced across the potentiometer 26 is utilized in an automatic volume control arrangement by introducing this output through a resistor 25 directly to the chassis 11 and to one terminal of a capacitor 19. The other terminal of the capacitor 19 is connected to the floating ground 9. The time constant of the RC circuit formed by the capacitor 19 and the resistor 25 is large enough to filter the audio frequency signals. Actually, the signal across the potentiometer 26 includes the audio frequency signals and also includes a variable direct potential. The variations in the direct potential are produced as a result of undesired variations in the level of the radio frequency signals at the antenna loop 10. For example, the undesired variations in the level of the radio frequency signals may result from fading of the signals. The capacitor 19 and the resistor 25 filter the audio-frequency signals so that only variations in the direct potential resulting from fading of the input signals are introduced to the chassis 11. The potential of the chassis 11 relative to the floating ground 9 varies inversely therefore with the level of the input signals. The variation is inversely related to the change in level of the input signals because the resistor 25 is connected to the negative terminal of the capacitor 24.

The variations in the potential level of the chassis 11 relative to the floating ground 9 function to compensate for any fading in the input signals because the antenna loop 10 is directly connected to the chassis ground. A connection is also provided from the tuned circuit 20 to the chassis 11 so that the variations in direct potential on the chassis 11 relative to the floating ground 9 are also introduced to the input of the intermediate frequency amplifier. In this way, the intermediate frequency amplifier is also instrumental in compensating for any fading of the input signal.

The capacitor 19 performs a dual function. For example, the capacitor 19 operates in conjunction with the resistor 25 to provide a suitable time constant in the automatic volume control circuit arrangement. The capacitor 19 also functions as a radio frequency by-pass between the chassis ground 11 and the floating ground 9 to prevent electrical shock to any person contacting the chassis ground 11 and the floating ground 9. A contact may be established by a person who touches the plug 39 or the lower lead 39*a* in the single figure while standing on a wet surface. A coupling between the floating ground 9 and the chassis 11 is required to provide a return path for the radio frequency signals since the capacitors 12 to 15, inclusive, are connected to the chassis 11. The capacitor 19 must be sufficiently large to by-pass radio frequency current but not large enough to build up a relatively large charge which can shock a person contacting the chassis and an external ground. By way of illustration, only approximately 5 milliamperes at 60 cycles per second may be sufficient to injure a person.

Actually, the size of the capacitor 19 meets two sets of requirements, one as described above for the shock prevention function and the other for the automatic volume control. As part of the automatic volume control, the capacitor 19 provides for a time constant large enough to filter the audio frequency components but not sufficiently large to filter rapid fluctuations of the input signal level because the audio frequency bass response which is of similar frequencies is then reduced. The time constant should be between 0.1 second and 0.5 second to meet these requirements.

By utilizing a single capacitor 19 for both functions, intermediate frequency instability is reduced because the conventional volume control capacitor is eliminated. This results from the fact that intermediate frequency potentials have been produced across the volume control capacitor in previous receivers. A substantial saving is also obtained in the cost of manufacturing receivers. This results from the fact that the elimination of a single component costing only a few cents results in the savings of thousands of dollars when tens of thousands of receivers are produced in an assembly line.

Moreover, by utilizing the shock prevention capacitor 19 as part of the automatic volume control, the filtering or smoothing action of the audio frequency modulation is enhanced. The filtering action is enhanced because the minimum value of the capacitor for the shock prevention function is larger than the minimum value of the capacitor heretofore used from a cost standpoint for the filtering function in the automatic volume control. Since the value of the capacitor for the filtering function in the automatic volume control has now been increased, a corresponding enhancement in the smoothing action of the audio frequency modulation is also obtained.

In an illustrative embodiment of this invention, the following circuit parameters may be utilized:

| | |
|---|---|
| Capacitor **17** | 47 micromicrofarads. |
| Resistor **29** | 22,000 ohms. |
| Capacitor **19** | .1 microfarad, 200 volts. |
| Tube **16** | 12BE6. |
| Tube **21** | 12BA6. |
| Resistor **48** | 220 ohms. |
| Capacitor **24** | 220 microfarads. |
| Tube **23** | 12AV6. |
| Capacitor **27** | 2,000 micromicrofarads. |
| Resistor **25** | 2.2 megohms. |
| Potentiometer **26** | Maximum resistance 500,000 ohms. |
| Resistor **28** | 6.8 megohms. |
| Capacitor **30** | 250 microfarads. |
| Resistor **31** | 470,000 ohms. |
| Capacitor **32** | 5,000 micromicrofarads. |
| Capacitor **49** | 250 microfarads. |
| Resistor **34** | 470,000 ohms. |
| Tube **33** | 50C5. |
| Resistor **35** | 150 ohms. |
| Capacitor **36** | 10,000 micromicrofarads. |
| Tube **40** | 35W4. |
| Resistor **41** | 22 ohms. |
| Capacitor **42** | 10,000 micromicrofarads. |
| Capacitor **43** | 40 microfarads. |
| Capacitor **44** | 20 microfarads. |
| Resistor **46** | 1,000 ohms. |
| Speaker winding | 3.2 ohms. |
| Transformer **38** | 25,000 to 3.2 ohms. |

Although this application has been disclosed and illustrated with reference to particular applications, the principles involved are susceptible of numerous other applications which will be apparent to persons skilled in the art. The invention is, therefore, to be limited only as indicated by the scope of the appended claims.

I claim:

1. In a receiver for selectively receiving radio frequency signals which are modulated by audio frequency signals, input power leads for supplying power to the receiver, a first common junction connected to one of said power leads, a chassis serving as a second common junction, signal receiving means coupled electrically to said chassis and to said first common junction for receiving and amplifying the radio frequency signals, said signal receiving means including a capacitor coupled electrically between said chassis and said first common junction to provide a path for radio frequency signals therebetween, detecting means coupled to said receiving means for providing a signal having an audio frequency component corresponding to the modulation of the received radio frequency signals and a direct component variable in accordance with changes in the signal strength of the received radio frequency signals, means connecting said detecting means to said capacitor and to said chassis, and a volume control circuit arrangement coupled to said detecting means and including said capacitor of said receiving means for introducing between said chassis and said first common junction a direct biasing potential variable in accordance with the variations in the direct component to compensate for the changes in the signal strength of the received radio frequency signals.

2. In a receiver for receiving radio frequency signals which are modulated by audio frequency signals, an external common junction ground connection, a radio frequency tuned circuit directly connected to said external ground connection and constructed to select an individual one of the radio frequency signals at each instant, means coupled to said tuned circuit for providing a signal having an audio frequency component corresponding to the audio frequency modulation of said selected radio frequency signal and also a direct component variable in accordance with changes in the signal strength of said selected radio frequency signal at said tuned circuit, a power supply coupled to said providing means for supplying a direct potential for said providing means, said power supply including two energization input leads, an internal common junction ground connection connected to said providing means and to one of said input leads, capacitive means connected between said internal common junction ground connection and said external common junction ground connection for passing radio frequency signals and preventing shock upon contact of an individual to said internal common junction ground connection and said external common junction ground connection, and an automatic volume control arrangement connecting said providing means to said external ground connection, said arrangement including said capacitive means for filtering said audio frequency component and passing said variations in direct current component for introduction to said tuned circuit as a relative potential between said internal ground common junction connection and said external ground common junction connection to compensate for changes in the input level of said selected radio frequency signal.

3. In a receiver for selectively receiving radio frequency signals which are modulated by audio frequency signals, a chassis providing a first common ground connection, a second common ground connection, input means connected to the chassis ground connection for receiving the radio frequency signals, tuned circuit means coupled to the chassis ground connection for amplifying the received signals, means coupled to the tuned circuit means and to the second common ground connection and responsive to the amplified signals for detecting the audio frequency modulations in the amplified signals, means coupled to the detecting means and to the chassis ground connection for producing a direct potential having an amplitude variable in accordance with changes in the strength of the received signals, and for varying the potential of the chassis ground connection in accordance therewith, and capacitive means connected to the chassis ground connection and to the second common ground connection for preventing a person contacting the chassis ground and the floating ground from being electrically shocked and for introducing the variable direct potential to the input means to compensate for changes in the strength of the received signals.

4. The receiver set forth in claim 3 in which the last mentioned capacitive means constitutes a single capacitor connected between the chassis ground connection and the second common ground connection.

5. In a receiver for selectively receiving radio frequency signals which are modulated by audio frequency signals, a chassis providing a first common ground connection, a second common ground connection, input means connected to the chassis ground connection and constructed to receive the radio frequency signals, tuned circuit means coupled to the chassis ground connection and the second common connection for receiving the audio frequency signals from said input means and for detecting the received signals, said detecting means including means for recovering the audio frequency modulations in the detected signals, and means coupled to said recovering means and responsive to the recovered audio frequency modulations for producing a direct potential having characteristics variable in accordance with changes in such modulations resulting from changes in the strength of the received radio frequency signals, the last mentioned means being connected directly to the chassis ground connection and also to the second common ground connection to vary the potential at the chassis ground connection and at the input means relative to the potential at the second common ground connection in accordance with the changes in the recovered audio frequency modulations to compensate for variations in the strength of the received radio frequency signals, a capacitor connected between the chassis ground connection and the second common ground connection to provide a by-pass for the radio frequency signals through the tuned circuit means and to prevent a person contacting the chassis ground connection and the second common ground connection from being electrically shocked.

6. In a receiver for selectively receiving radio frequency signals which are modulated by audio frequency signals, a chassis providing a first common connection, a floating ground, providing a second common connection, input means connected to the chassis ground and constructed to receive the radio frequency signals, first detector means including a tuned circuit coupled to the input means and including first and second elements in the tuned circuit and having the first element connected to the chassis ground and having the second element connected to the floating ground to detect the received signals for the production of corresponding signals of intermediate frequency, second detector means coupled to the floating ground and responsive to the intermediate frequency signals to detect the audio frequency modulations in the intermediate frequency signals for the production of audible sounds in accordance with such audio frequency modulations, and means responsive to the audio frequency modulations from the second detecting means for producing a direct potential having characteristics variable in accordance with changes in the audio frequency modulations resulting from changes in strength of the received signals, the last mentioned means being provided with first and second terminals respectively connected directly to the chassis ground and the floating ground for introducing the variations in the direct potential to the input means to compensate for any changes in the strength of the received signals, a single capacitor included in the first detector means and connected to the chassis ground and the floating ground to facilitate a passage of the radio frequency signals through the detector means and to prevent a person contacting the chassis ground and the floating ground from being electrically shocked.

References Cited in the file of this patent

UNITED STATES PATENTS 2,261,203 Albright ---------------- Nov. 4, 1941
2,281,488 Freeland -------------- Apr. 28, 1942